United States Patent Office.

ASAHEL K. EATON, OF BROOKLYN, NEW YORK, ASSIGNOR OF ONE-THIRD TO COLIN M. THOMPSON, OF SAME PLACE.

POROUS CUP FOR GALVANIC BATTERIES.

SPECIFICATION forming part of Letters Patent No. 385,344, dated July 3, 1888.

Application filed October 7, 1887. Serial No. 251,750. (No specimens.)

*To all whom it may concern:*

Be it known that I, ASAHEL K. EATON, a citizen of the United States, residing at Brooklyn, in the county of Kings and State of New York, have invented certain new and useful Improvements in Galvanic Batteries; and I do hereby declare the following to be a full, clear, and exact description of the invention, such as will enable others skilled in the art to which it appertains to make and use the same.

This invention relates to galvanic batteries.

Heretofore in the use of galvanic cells, wherein an alkaline solution has been employed as the exciting-fluid, great difficulties, with attending loss and deterioration of the battery, have been experienced by the disintegration or the rapid destruction of the porous cup.

The object of this invention is to produce a porous cup which shall be practically indestructible.

To this end the invention consists, first, in a porous cup the body of which is formed of asbestus; furthermore, in a porous cup composed of asbestus and a suitable binding or strengthening substance to the asbestus; and, finally, in the method of producing this compound cup.

To carry my invention into effect, I first form the cup of the ordinary commercial sheet-asbestus, or, what is better, of pulp-asbestus, by pressing this in a suitable mold, and I then re-enforce and strengthen this cup by silica, alumina, or other suitable substance that will act as a binding material, in the following manner: I soak the cup in a mixture of starch and silicate of soda and then slowly dry it. Next, I subject it to high heat—that is, a heat sufficient to produce the following results, namely: first, to effect dehydration of the asbestus; and, secondly, to reduce the silicate of soda to silica in its hard insoluble state. At the high heat employed the soda present in the silicate is reduced by the carbon element of the starch, the sodium being volatilized, whereupon silica remains as a cementing, re-enforcing, and strengthening material in the asbestus cup.

Sugar, tar, molasses, or any substance containing the requisite carbon may be substituted for the starch.

Instead of the silicate just described, I sometimes make use of sulphate of alumina or other substance which will yield a suitable cementing, binding, and strengthening material, and in such case a substance containing carbon—such as starch, &c., above—is not absolutely required, since the acid will be expelled by the heat alone, thus, in the case of the sulphate of alumina, leaving pure alumina as the cementing, binding, and strengthening material, though even here the decomposition takes place more readily, it is believed, when starch or its equivalent is used.

A cup thus formed is practically indestructible under the action of alkaline exciting-fluids, and presents but very slight internal resistance, while it can be produced at less cost than the ordinary clay cup. It is of course unaffected by acids.

Having thus described my invention, what I claim as new, and desire to secure by Letters Patent, is—

The method of producing an indestructible cup for a galvanic battery, which consists in first forming the cup of sheet-asbestus or pressing pulp-asbestus into a suitable mold to form the cup, then soaking the cup thus formed in a mixture of suitable carbonaceous substance and silicate of soda, removing it from the mixture and allowing it to dry, and finally subjecting the cup to a high heat to leave a strengthening and binding material in the body, substantially as described.

In testimony whereof I affix my signature in presence of two witnesses.

ASAHEL K. EATON.

Witnesses:
R. G. DYRENFORTH,
W. W. MORTIMER.